Figure 1:
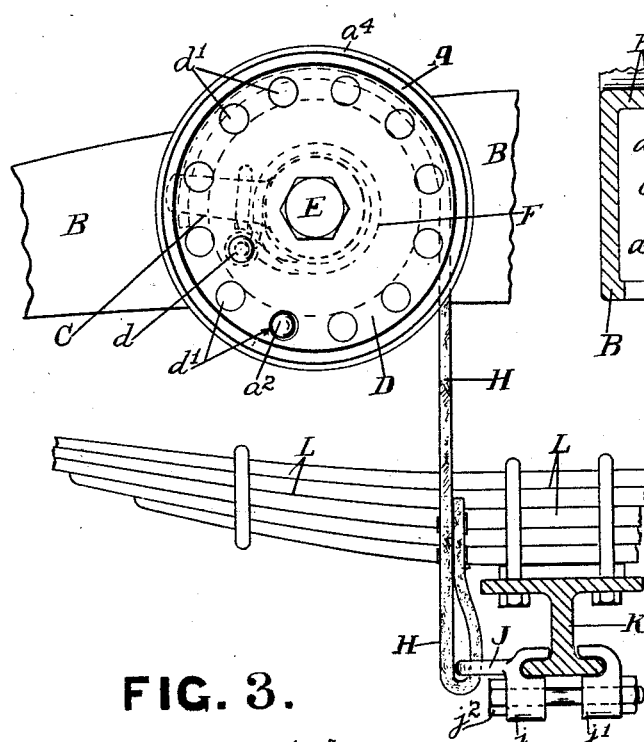

June 23, 1925.  F. G. G. ARMSTRONG  1,543,243
SHOCK ABSORBER FOR MOTOR CARS AND OTHER MOTOR ROAD VEHICLES
Filed Oct. 1, 1923

Inventor
Fullerton G. G. Armstrong
by Herbert W. T. Jenner,
Attorney

Patented June 23, 1925.

1,543,243

UNITED STATES PATENT OFFICE.

FULLERTON GEORGE GORDON ARMSTRONG, OF BEVERLEY, ENGLAND.

SHOCK ABSORBER FOR MOTOR CARS AND OTHER MOTOR ROAD VEHICLES.

Application filed October 1, 1923. Serial No. 666,013.

*To all whom it may concern:*

Be it known that I, FULLERTON GEORGE GORDON ARMSTRONG, a subject of the King of Great Britain, residing at Beverley, in the East Riding, of the county of York, England, have invented certain new and useful Improvements in Shock Absorbers for Motor Cars and Other Motor Road Vehicles, of which the following is a specification.

This invention relates to shock-absorbing means for road vehicles.

It is well known that the ordinary suspension or bearing springs of road vehicles do not absorb the vibrations and shocks to which the vehicles are subjected owing to the unevenness of roads over which they are travelling.

The object of my invention is to provide road vehicles, and especially motor road vehicles, with extremely simple means which will retard the recoil of the ordinary springs of the vehicle and so will entirely prevent vibrations and shocks to which the vehicles are subjected when provided with the ordinary bearing or suspension springs only.

For the accomplishment of the before mentioned object, the invention consists of a friction member in the form of a flanged drum fixed to the chassis or body of the vehicle, the said drum having a loose front plate.

A suitable slot-hole is formed in the periphery of the drum body, that is, in the portion between the two flanges, such slot-hole extending a suitable distance around such body.

In the body of the drum is a lever or arm, the outer end of which projects through the slot-hole in the drum body and the inner end of which is pivoted at the centre of the drum.

Encircling the inner and pivoted end of the arm which is enlarged to form a preferably round boss of almost the same thickness as the internal width of the drum, is a coiled spring one end of which engages the pivoted lever or arm and the other end of which is connected to a stud or projection on the inside of the removable front plate of the drum.

To the portion of the arm which projects outside the slot-hole in the drum body is connected one end of a belt or cable the other end of which is connected to one of the axles of the road wheels, or to a link or eye secured to the axle, the belt or cable being normally in tension.

The front of the drum is provided with a stud and the removable cover plate with a plurality of holes arranged a suitable distance apart near its periphery whereby on such cover plate being given a part of a turn for one or other of the holes therein to be engaged by the stud on the front of the drum, the tension of the spring and consequently of the belt or cable can be increased or decreased as required.

The removable front plate is conveniently secured in position by a bolt which screws into the back wall of the drum and which passes through the inner end of the lever or arm and which forms the pivot for such lever or arm.

My invention will be readily understood from the following detailed description taken in conjunction with the appended sheet of drawings forming a part of this specification.

Figure 2:
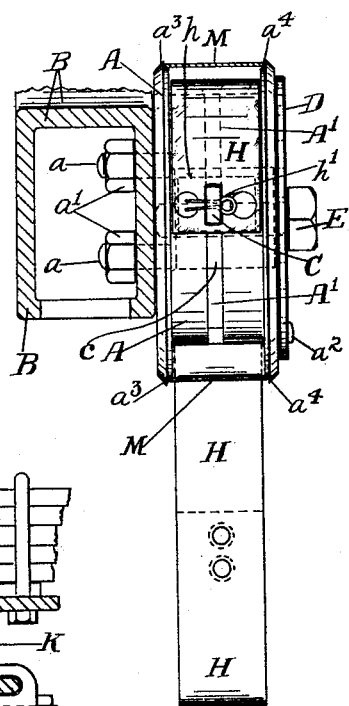
Figure 3:
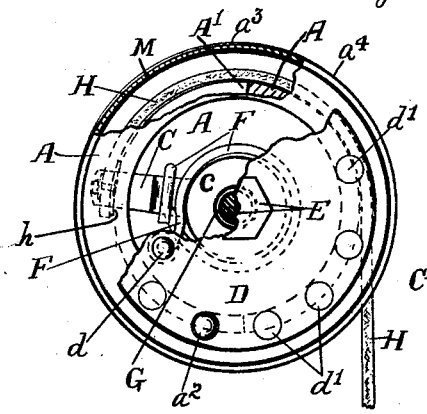
Figure 4:
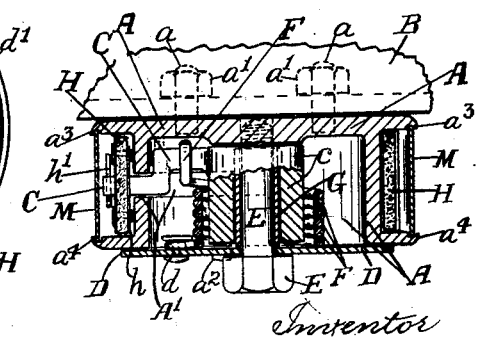

In the drawings Fig. 1 is a front view of a shock-absorbing device in accordance with my invention, applied to a vehicle, portions only of which are shown, and Fig. 2 is an end view of Fig. 1 but with the bearing spring, axle and link shown in Fig. 1, omitted. Fig. 3 is a front view of the device shown partly in section and Fig. 4 is a sectional plan view.

Referring to the drawings, A indicates a pulley-like drum open at its front and provided with strong screw threaded studs $a$, $a$ at the back which pass through holes in the chassis B of the vehicle, $a^1$, $a^1$ being nuts screwed on the threaded studs $a$, $a$ to secure the drum A to the chassis, and $A^1$ is a slot-hole of a suitable width in the body of the drum and which extends around the same for a suitable distance.

C is a lever or arm the inner end of which is enlarged and is shown being in the form of a boss-like portion $c$ which is almost as wide as the width of the interior of the drum A, the outer end of which lever or arm passes through the slot-hole $A^1$ and projects outside the same slightly, D is a loose strong disc or circular plate which covers the open front of the drum and E is a bolt which passes through a hole in the center of the cover plate D and through the enlarged inner end of the lever or arm C and is screwed into a tapped hole in the centre of the back wall of the drum, the said bolt serving to secure the cover plate to the drum and also as the pivot for the lever or arm to turn on.

F is a coiled spring which encircles the enlarged inner end of the lever or arm C, one end of such spring being bent into the form of a hook which engages the lever or arm C and the other end being connected to a stud $d$ with which the cover plate is provided and which projects from the inside of such plate to allow of this.

$d^1$ represents a number of holes arranged on a circular line around the cover plate D, and $a^2$ is a stud on the front of the drum A. By turning the cover plate for the stud $a^2$ on the drum to pass into one or the other of the holes $d^1$ in such cover plate, the tension on the spring F can be increased or decreased at will.

G is a metal tube slightly longer than the enlarged inner end of the lever or arm C is wide, and which is passed into the hole through such enlarged inner end which is an easy working fit thereon, which tube is nipped between the cover plate and the back wall of the drum, such tube forming a distance piece between the cover plate and the back wall of the drum, so preventing the cover plate from bearing on the enlarged inner end of the lever or arm C and of its consequent liability to prevent free movement of the lever or arm.

H is a strong piece of belting, one end of which is connected to that end of the lever or arm C which projects through the slot-hole $A^1$ in the body of the drum, the said end of the belt being preferably reinforced by means of a metal piece $h$ riveted to its underside, the belt and the metal piece each having a hole through them, through which the end of the lever or arm passes, the end of the belt being secured on the end of the lever or arm by a split pin $h^1$ passed through a hole in the projecting portion of the lever or arm, J being a lug on one of a pair of clamping pieces $j$, $j^1$ secured to a road wheel axle K by bolts $j^2$, only one of which is seen (see Fig. 1) to which lug the other end of the piece of belting H is connected.

As will be readily understood, the end of the piece of belting remote from that connected to the lever or arm pivoted in the drum, may be connected to the road wheel axle itself instead of to a lug connected to such axle, or it may be connected to the bearing spring L of the vehicle and the device still be equally as effective.

M is a metal casing arranged between the flanges $a^3$, $a^4$ of the drum and which covers the slot-hole in the drum and the portion of the belt which embraces the drum, an aperture being provided in such casing for the belt to pass through for attachment to the axle or equivalent part of the vehicle, and the flanges of the drum being rabbetted on the inside to provide annular seats for such casing which is held in position by bending the edges of the flanges inwardly over the edges of the casing.

It will be obvious that the operation of the apparatus would be the same if its arrangement were reversed, that is to say, if the drum were attached to the axle or to a bearing spring and the end of the belt remote from that connected to the drum, were connected to the chassis or to the body of the vehicle.

When the device is fitted to the vehicle and is set to operate and the vehicle is at rest, the outer end of the lever or arm to which the belt or cable is connected, is a suitable distance from each end of the slot-hole in the body of the drum whereby such lever or arm is free to work in both directions, that is, under the action of the spring in one direction and the pull of the belt or cable in the other direction.

In operation, when the bearing springs of the vehicle yield to any unevenness of the road and the axle and the body of the vehicle move towards each other as a result thereof, and the belt consequently slackens, the coiled spring in the drum expands and acting on the lever or arm pivoted in such drum causes such lever or arm to draw the belt further around such drum and so causes it to have an increased grip of the same, such increased grip being proportional to the increased strength or power of the bearing springs resulting from the compression of such springs with the result, the greater the bumps the vehicle is subjected to and consequently the greater the compression of the bearing springs, the greater is the resistance of the device to the recoil of the bearing springs.

What I claim and desire to secure by Letters Patent is:—

1. A shock absorber comprising a stationary drum having a pin which projects on one side of it, said drum having also a circumferential slot, a pivoted arm which projects through the slot, a flexible connection secured to the projecting end of the arm and bearing on the drum, a spring arranged in the drum and secured to the said arm, a plate for adjusting the strength of the spring provided with a series of holes for engaging with the said pin, and means for securing the plate to the drum.

2. A shock absorber, comprising a stationary drum having a fastening bolt secured to it and arranged on its axis, said drum having also a circumferential slot, a pivoted arm which projects through the said slot, a spring arranged in the drum and secured to it and to the said arm, a flexible connection secured to the projecting end of the arm and bearing on the drum, a tube mounted on the said fastening bolt, and a cover plate for the drum clamped against the end of the said tube by the fastening bolt, the said arm being pivoted loosely on the said tube.

In testimony whereof I affix my signature.

FULLERTON GEORGE GORDON ARMSTRONG.